Feb. 15, 1966  R. E. RIEBS  3,235,788
VOLTAGE MAGNITUDE CONTROL CIRCUIT
Filed Sept. 17, 1962  3 Sheets-Sheet 1
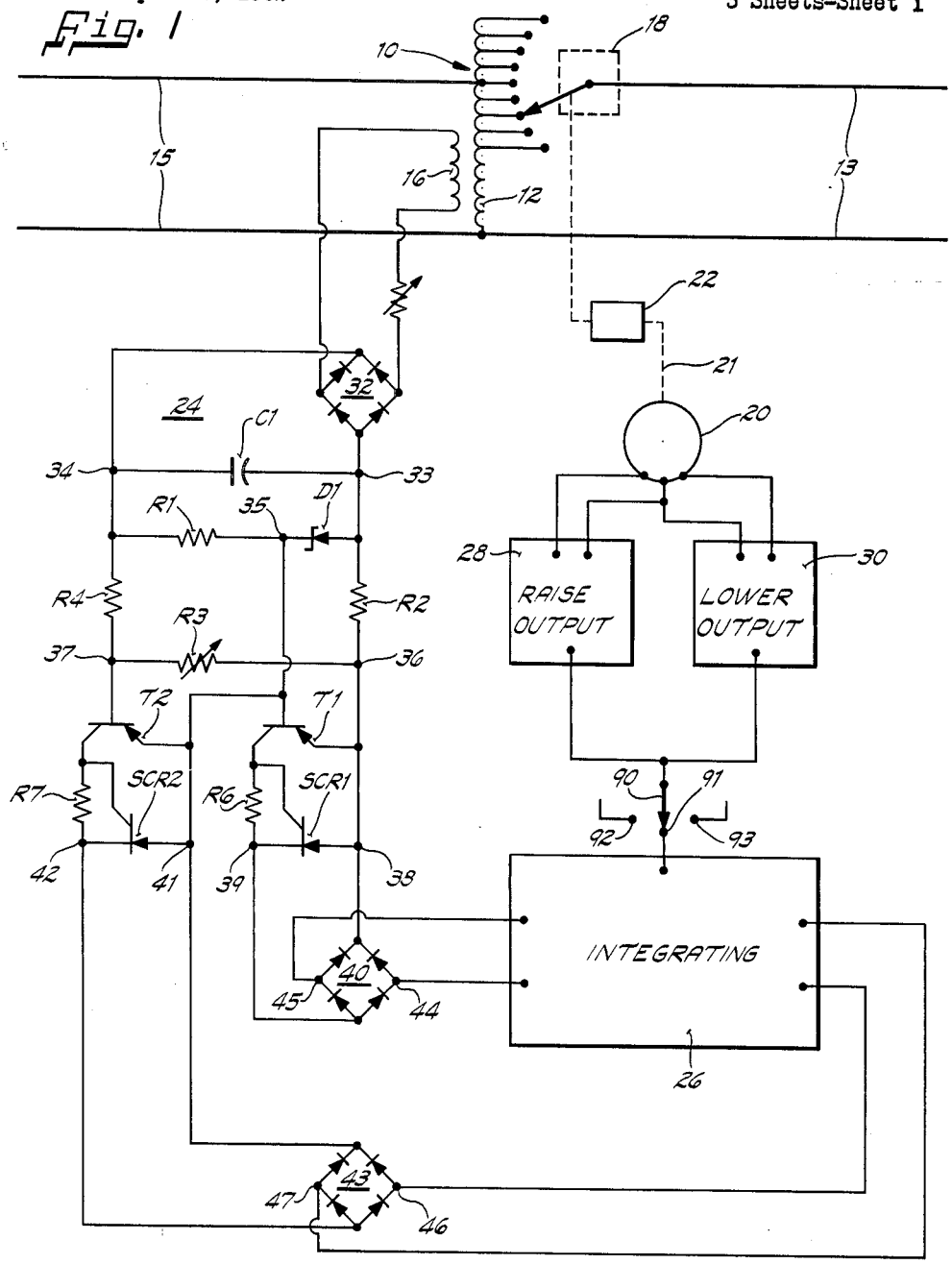
INVENTOR.
Richard E. Riebs
BY Fred Wiviott
Attorney

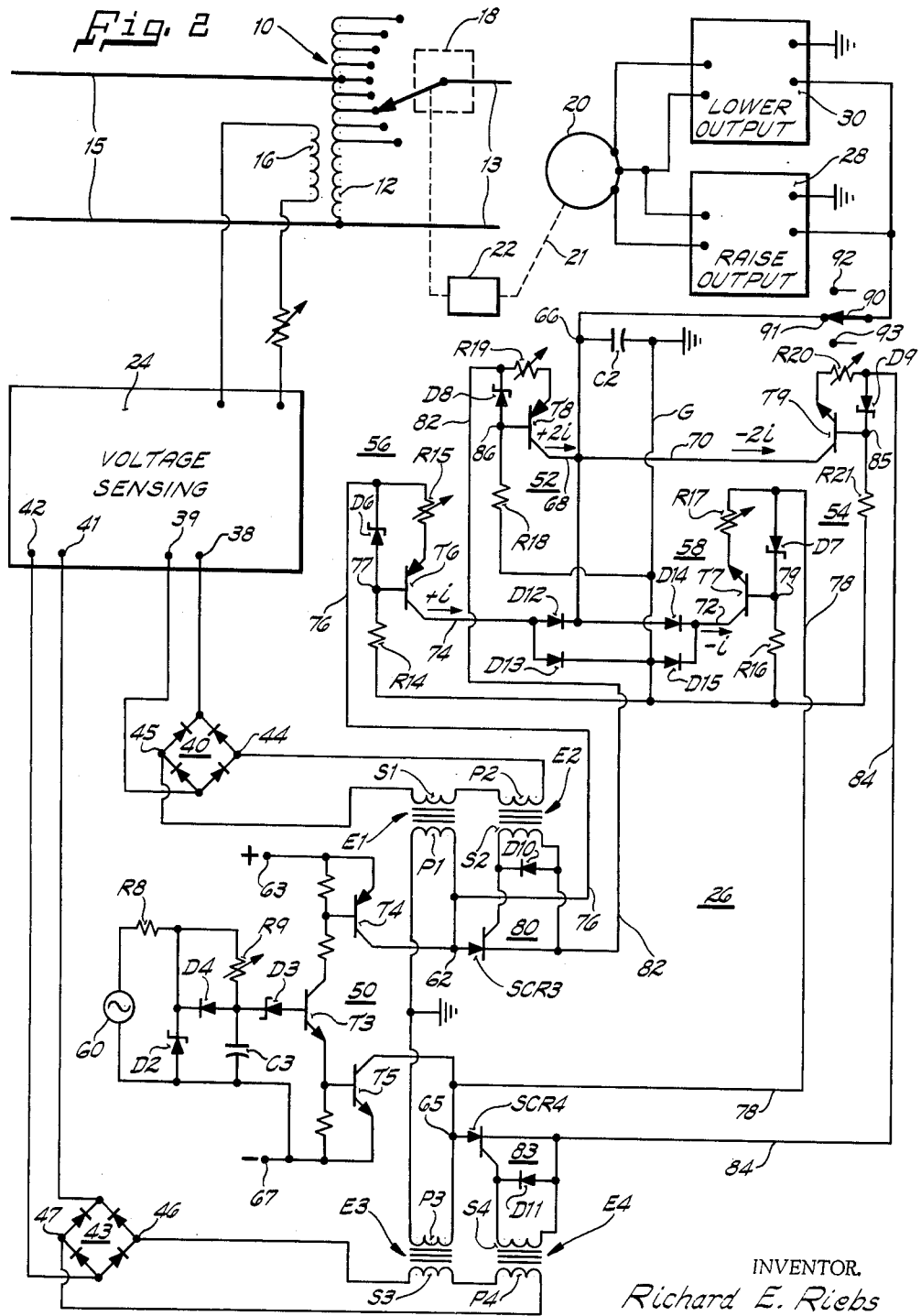

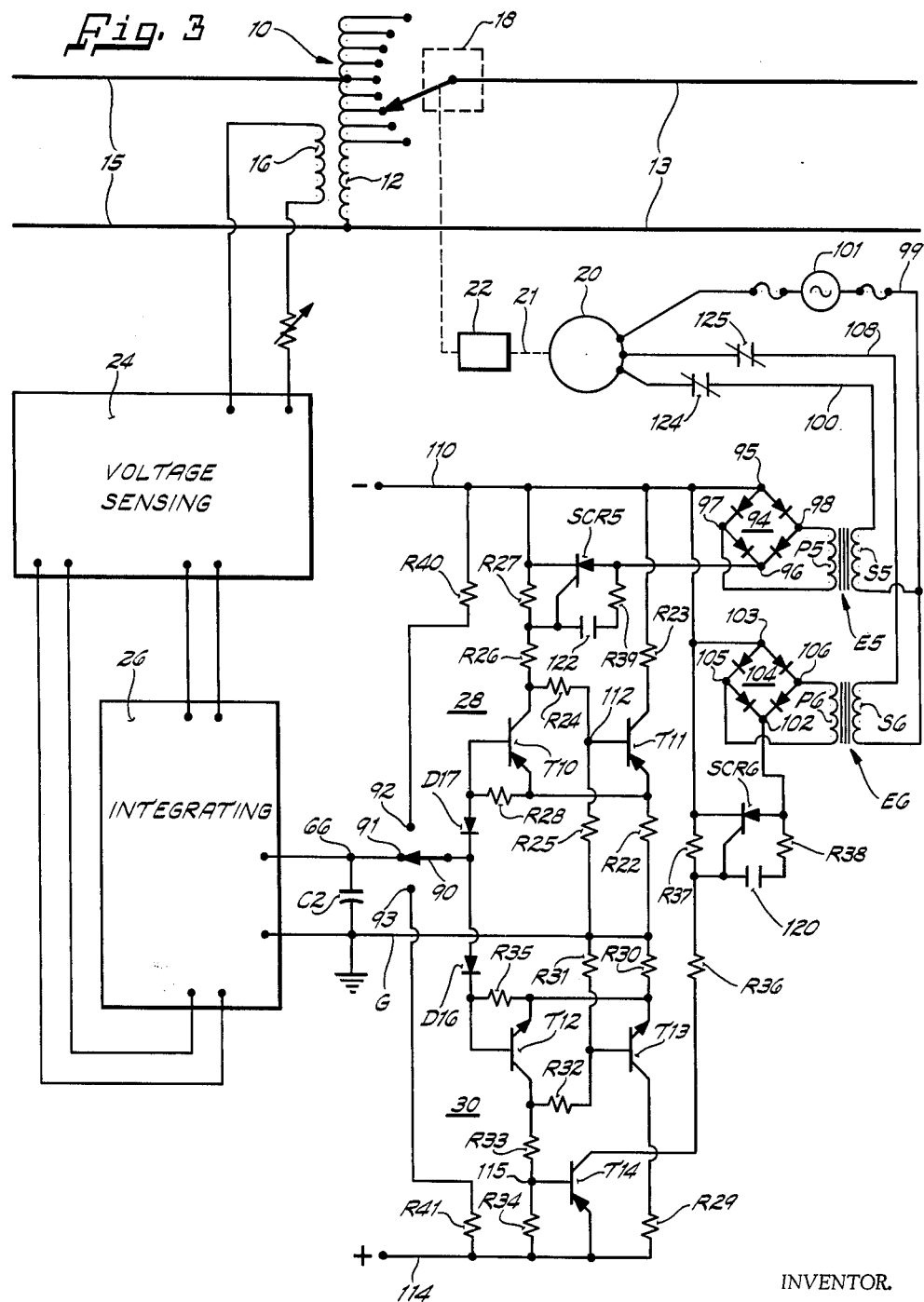

United States Patent Office 3,235,788
Patented Feb. 15, 1966

3,235,788
VOLTAGE MAGNITUDE CONTROL CIRCUIT
Richard E. Riebs, Hales Corners, Wis., assignor to McGraw-Edison Company, Milwaukee, Wis., a corporation of Delaware
Filed Sept. 17, 1962, Ser. No. 224,180
20 Claims. (Cl. 323—43.5)

This invention relates to control circuits and more particularly to a circuit for controlling the tap changing motor of a voltage regulator.

Tap changing voltage regulators are devices operative to maintain the voltage of a load circuit within a prescribed band. Should the load voltage deviate from within the band limits, a tap switch is actuated by a tap changing motor to increase or decrease the number of turns in the regulator winding to thereby return the load voltage to within the desired limits. The control for such tap changing motors includes a voltage sensing means and means for actuating the motor in a first direction when the voltage falls below the desired limits and which is operative to actuate the motor in the opposite direction when the voltage rises above these limits.

It is an object of the invention to provide a completely static control circuit for the tap changing motor of a voltage regulating transformer.

A more specific object of the invention is to provide a control circuit for the tap changing motor of a voltage regulating device and including circuit means operative to initiate the charging of an energy storage device in a first sense when the system voltage rises above prescribed limits and in an opposite sense when the system voltage falls below said limits, and to discharge the energy storage device when the system voltage returns to within its prescribed limits. Output means is responsive to the magnitude and senses of the energy on the storage means and operative to actuate the tap changing motor in a corrective direction when the level of stored energy reaches a predetermined value in either sense.

Another object of the invention is to provide a voltage regulating device wherein voltage sensing circuit means initiates the flow of a constant current to an integrating capacitor to charge the same in a first sense when the regulated voltage rises above prescribed limits and at a constant rate in the opposite sense when the regulated voltage falls below said limits.

A further object of the invention is to provide a voltage regulating device wherein the flow of periodic recurring current pulses are initiated to charge an integrating capacitor in a first or an opposite sense when the regulated voltage rises above or falls below prescribed limits. A still further object is to provide such a regulating device with means for adjusting the time-energy integral of the current pulses.

These and other objects and advantages of the instant invention will become more apparent from a detailed description thereof taken with the accompanying drawings in which:

FIG. 1 is a schematic diagram of a voltage regulating device according to the instant invention in which the voltage sensing portion thereof is shown in detail;

FIG. 2 is a schematic diagram of the device illustrated in FIG. 1 in which the integrating portion thereof is shown in greater detail; and FIG. 3 is a schematic diagram of the device illustrated in FIGS. 1 and 2 in which the output portions thereof are shown in greater detail.

Referring now to the drawings in greater detail, FIG. 1 shows a voltage regulator indicated generally by the reference numeral 10 and which is provided with an autotransformer 12 connected to a power line 13 through a suitable tap changer 18 and to a load line 15. The tap changer 18 is driven by a motor 20 having an output shaft 21 which is connected to the tap changer 18 through suitable gear mechanism 22. Motor 20 may be of any convenient type, such as, a two winding induction motor with capacitance start.

The tap changer 18 is merely schematically illustrated since the details thereof form no part of the instant invention, it being understood that any suitable well known tap changer may be utilized. It will be further understood, that while the invention is illustrated and described with respect to the control of a voltage regulator, it may also be employed in other types of electrical apparatus such as capacitor switches and the like.

In general, the control circuit for initiating the operation of the tap changer 18 includes a voltage sensing portion 24 coupled to the load line 15 by means of a winding 16 which is inductively coupled to the autotransformer 12 and which senses the voltage in the load line 15. The control circuit also includes an integrating portion 26 connected to the voltage sensing portion 24 and operable to actuate a raise output portion 28 or a lower output portion 30 depending upon the direction that the load voltage deviates from the band limits. The voltage sensing portion 24 is operable to produce a raise signal when the voltage in load line 15 falls below the band limits and a lower signal when the load voltage rises above the band limits. Because transient conditions in load line 15 may cause momentray deviations of the load voltage from within the band, the integrating portion 26 is operable to directionally integrate the raise or lower signals from the voltage sensing portion 24 and to produce a raise signal to the raise output portion 28 or a lower signal to the lower output portion 30 should the output signal from the voltage sensing portion 24 continue for a predetermined length of time. The raise output portion 28 and lower output portion 30 are then operative to energize the motor 20 which drives the tap changer 18 in an appropriate direction to return the load voltage to within the band limits.

The voltage sensing circuit 24 is shown in FIG. 1 to include a capacitor C1 which is coupled to the voltage sensing winding 16 through a full wave rectifier 32. The series combination of a Zener diode D1 and a resistor R1 are connected across the terminals 33 and 34 of the capacitor C1. Because the voltage drop across diode D1 will at all times be equal to its Zener voltage, the potential at junction point 35, between diode D1 and resistor R1 will be equal to the voltage across the capacitor C1 minus the Zener voltage of D1. Hence, because the Zener voltage of D1 remains constant it can be seen that the potential at junction point 35 will change through the same number of volts as the negative terminal 33 of capacitor C1 whose voltage in turn is proportional to the voltage in the load line 15.

A resistor string consisting of resistors R2, R3 and R4 are also connected across the capacitor terminals 33 and 34. It will be appreciated that the potentials at the junction points 36 and 37, between resistors R2 and R3 and between resistors R3 and R4, respectively, vary in direct proportion to changes in the voltage across capacitor C1. The resistance of R2 is much larger than that of R3 or R4 so that the voltage drop across R2 will be substantially the entire applied voltage. As a result, changes in the potential at junction points 36 and 37 will be only a small fraction of the total change in the voltage across capacitor C1. In this manner, a pair of voltage signals are produced at junction points 36 and 37 whose values are different from each other and which are substantially fixed with respect to the potential at junction point 34.

The voltage sensing portion 24 also includes a first

PNP type transistor T1 whose base and emitter are respectively connected to junction points 35 and 36 and a second PNP transistor T2 whose emitter and base are respectively connected to the junction points 35 and 37. In addition, the emitter and collector of T1 are respectively connected to the anode and gate of a silicon controlled rectifier SCR1 and the emitter and collector of T2 are respectively connected to the anode and gate of the second silicon controlled rectifier SCR2.

The anode and cathode of SCR1 are connected across the output terminals 38 and 39 of a full wave rectifier 40 and the anode and cathode of SCR2 are connected across the output terminals 41 and 42 of a second full wave rectifier 43.

Resistors R6 and R7 are inserted between the cathode and gate of SCR1 and SCR2, respectively, to provide a path for leakage current from the anode to the gate without going through the cathode.

For a more complete description of the voltage sensing circuit 24 just described, reference is made to application Serial No. 149,442, filed November 1, 1961 and assigned to the assignee of the instant application.

Referring now to FIG. 2, which shows the integrating portion 26 in greater detail to include a voltage pulse generating portion 50, a positive drive portion 52, a negative drive portion 54, a positive return portion 58, a negative return portion 56 and an integrating capacitor C2.

The positive drive portion 52 is coupled to the output terminals 44 and 45 of the full wave rectifier 40 through a switching circuit 80 and is operative when rectifier 40 is short circuited to charge the capacitor C2 linearly in a positive sense. Similarly, the negative drive portion 54 is coupled to the output terminals 46 and 47 of the full wave rectifier 43 through a switching circuit 83 and is operative when rectifier 43 is short circuited to charge the capacitor C2 linearly in a negative sense. The negative return circuit 56 is operative to linearly discharge the capacitor C2 when it is negatively charged and the positive return circuit 58 will discharge the capacitor C2 linearly when it has a net positive charge.

The positive drive circuit 52 and the negative return circuit 56 are each constructed and arranged to provide a positive current pulse of constant amplitude when a square wave voltage is applied to it. Similarly, the negative drive circuit 54 and the positive return circuit 58 are each constructed and arranged to provide a negative current pulse of constant amplitude when a negative square wave voltage is applied to it. The pulse generator 50 provides the voltage pulse signals required for the operation of the circuits 52, 54, 56 and 58.

Before discussing the circuits 52, 54, 56 and 58 in greater detail, the pulse generator 50 will be described. This circuit is a conventional variable turn on device in which a single pulse of variable width is generated for each cycle of power supplied by the alternating source 60. It will be appreciated that during the negative half cycle of source 60, a voltage signal will appear across the Zener diode D2 which is equal to its Zener voltage. During the positive half cycle, however, current will pass through diode D2 with no voltage drop across it. This results in a truncated sinusoidal voltage impulse appearing at the positive terminal of D2 during alternate half cycles. These voltage impulses charge the capacitor C3 through adjustable resistor R9. Capacitor C3 charges until its potential reaches the Zener voltage of diode D3 whereupon all further current will pass through D3 to the base of a transistor T3. During the reverse half cycle, diode D4 is biased in a direction which causes the complete discharge of capacitor C3 so that it is ready to begin charging from zero at the start of the next half cycle.

The rate of charge of capacitor C3 will be controlled by the adjustable resistor R9 so that the width of the current pulse through D3 to the base of T3 can be controlled by the setting of R9. For example, decreasing the resistance of R9 will cause C3 to charge in a shorter time so that the current pulse through D3 will be wider.

When current flows to the base of transistor T3, it will begin conducting emitter and collector current to the base of each of a pair of transistors T4 and T5 which also become conductive. This connects the input terminal 62 of the positive drive circuit 52 and the negative return circuit 56 to a positive D.C. source terminal 63 and the input terminal 65 of the negative drive circuit 54 and the positive return circuit 58 to a negative supply terminal 67. Thus, a positive constant voltage signal will appear at the terminal 62 and a negative constant voltage signal will appear at the terminal 65 as long as the transistors T4 and T5 respectively are conducting. The latter event will occur whenever current is being passed by the diode D3 to the transistor T3. As a result, periodically recurring positive square wave signals will appear at terminal 62 and negative recurring square wave signals will appear at the negative terminal 65.

Referring again to the positive drive circuit 52, it is shown in FIG. 2 to be connected to terminal 62 by a conductor 82 and through a switching circuit 80. Circuit 52 includes a Zener diode D8 and a resistor R18 connected in series between conductor 82 and a ground bus G. In addition positive drive circuit 52 also includes a transistor T8 of the PNP type whose base is connected to junction point 86 between R18 and D8 and whose collector is connected to one of the terminals 66 of integrating capacitor C2 through a conductor 68. The emitter of T8 is connected to conductor 82 through an adjustable resistor R19.

Each time switching circuit 80 passes a positive voltage impulse to the conductor 82 a voltage drop will appear across diode D8 equal to its Zener voltage due to the bias current drawn by resistor R18. The emitter current of T8 will increase until the IR drop across R19 is equal to the Zener voltage of D8. This results in a fixed emitter current, which, in turn, results in a fixed collector current in conductor 68 symbolized $+2i$.

Similarly, conductor 84 connects the negative drive circuit 54 to the negative output terminal 65 through a second switching circuit 83. In a similar manner too, the negative drive circuit 54 includes a transistor T9 of the NPN type whose base is connected to the junction 85 between a Zener diode D9 and a resistor R21, the latter of which is also connected to the ground bus G. When the switching circuit 83 passes a negative voltage pulse to the conductor 84, emitter current from T9 will increase until the voltage drop across adjustable resistor R20 equals the Zener voltage of D9 so that a constant square wave current symbolized $-2i$ will be drawn through the collector of T9 and a conductor 70 which is also connected to terminal 66 of capacitor C2.

Negative return circuit 56 is similar to the positive drive circuit 52 and is shown in FIG. 2 to be directly connected to terminal 62 by a conductor 76 and to include a Zener diode D6 and resistor R14 connected in series between conductor 76 and the ground bus G. The base of a transistor T6 of the PNP type is connected to a junction point 77 between D6 and R14 while the emitter is connected to conductor 76 through an adjustable resistor R15 and its collector is connected to a conductor 74. Negative return circuit 56 operates in a similar manner to positive drive circuit 52 so that during each positive voltage pulse from terminal 62, a constant square wave current symbolized $+i$, will flow from the collector of T6 through conductor 74.

Because each of the return circuits 56 and 58 are directly connected to the positive and negative terminals 62 and 65 respectively, they will operate whenever voltage pulses appear at these terminals. However, the drive circuits 52 and 54 are to operate only when an appropriate signal is received from the voltage sensing circuit 24. As a result, the first switching circuit 80 is interposed in conductor 82 between positive voltage terminal 62 and positive drive circuit 52 and the second switching circuit 83 is interposed in conductor 84 between the negative drive circuit 54 and the negative supply terminal 65.

Switching circuit 80 includes a first transformer E1 having a primary winding P1 in circuit with the positive voltage terminal 62 and a secondary winding S1 in circuit between the output terminals 44 and 45 of full wave rectifier 40. Switching circuit 80 also includes a second transformer E2 having a primary winding P2 in series with winding S1 and a secondary winding S2 connected between conductor 82 and the gate electrode of a silicon controlled rectifier SCR3.

In a similar manner, the switching circuit 83 includes a first transformer E3 having a primary winding P3 in circuit with the negative voltage output terminal 65 and the secondary winding S3 in circuit with terminals 46 and 47 of full wave rectifier 43. A second transformer E4 has a primary winding P4 in series with winding S3 and a secondary winding S4 connected between the anode and gate of a silicon controlled rectifier SCR4.

Diode D10 in switching circuit 80 and diode D11 in switching circuit 83 are provided to bypass S2 and S4 secondary currents in the reverse direction so that they will not flow through SCR3 and SCR4 respectively.

As will be seen in greater detail hereinbelow, when a short circuit appears across output terminals 44 and 45 of rectifier 40 switching circuit 80 will connect positive drive circuit 52 to the terminal 62 so that the latter will deliver a current of $+2i$ to the capacitor C2 from the positive drive circuit 52. Also, a current of $-i$ will be drawn from this terminal by the positive return circuit 58. As a result, a net positive current of $i$ will flow to the capacitor C2 so that it will charge at a constant rate. Should the short circuit disappear from the terminals 44 and 45, however, current will cease flowing from the positive drive circuit 52 but will continue to flow to the positive return circuit 58. Thus, capacitor C2 will begin discharging at a current rate of $-i$. In this manner, when capacitor C2 is charging positively, it will be charged at a constant rate by a current $i$ and when discharging will similarly be discharged by a current $i$ so that its rate of positive charging and discharging will be constant.

Similarly, when a short circuit appears across terminals 46 and 47, negative drive circuit 54 will draw a current $-2i$ from the terminal 66 of capacitor C2 while negative return circuit 56 will provide a current of $+i$ through conductor 74 so that capacitor C2 will be charged at a constant negative rate by a current $-i$. When the short circuit disappears from the terminals 46 and 47 the current $-2i$ will cease flowing in conductor 70 but the current $+i$ will continue flowing in conductor 74 so that the negative charge on capacitor C2 will discharge at a constant rate by a current of $+i$.

It will be recalled that the width of the voltage pulses at terminals 62 and 65 are controlled by the resistance of R9. It will also be appreciated that the width of the current pulses from each of the current circuits 52, 54, 56, and 58 is determined by the widths of the voltage pulses. By adjusting resistor R9, therefore, the time-energy integral of each of the current pulses may be controlled so that the charging and discharging rate of the integrating capacitor C2 may be adjusted.

Referring now to FIG. 3, the raise and lower output sections 28 and 30 are shown to be connected to the capacitor C2 through a selector switch 90, which has a center contact 91 for automatic operation, a manual raise contact 92 and a manual lowering contact 93.

The raise output circuit 28 includes a flip-flop circuit consisting of a normally off PNP type transistor T10 and a normally on PNP type transistor T11. The gate electrode of a silicon controlled rectifier SCR5 is connected to the collector of normally off transistor T10 through a resistor R26 and the anode and cathode of SCR5 are connected to the output terminals 95 and 96 of a full wave rectifier 94.

More specifically, the emitter of transistor T11 of the raise output circuit 28 is connected to the ground bus G through resistor R22 and its collector connected to the positive supply bus 110. The base of transistor T11 is connected to junction 112 between resistors R24 and R25 which are part of a resistor string that is connected between the ground bus G and the positive supply bus 110 and which also includes resistors R26 and R27. With a proper selection of resistor sizes, transistor T11 can be operated in its saturated region. Transistor T10, on the other hand, will be reverse biased with its emitter held at a negative potential by the drop across R22 while its base is held at emitter potential by resistor R28.

It will be appreciated that when T10 is off, no current will flow to the gate of SCR5. The primary winding P5 of a transformer E5 is connected to the input terminals 97 and 98 of rectifier 94 so that P5 is open circuited when transistor T10 is off and SCR5 is non-conductive. The secondary winding S5 of transformer E5 is connected in circuit between conductors 99 and 100 which connect the raise winding of motor 20 to A.C. source 101. As a result, when winding P5 is open circuited, winding S5 presents substantial impedance to the energizing circuit of the raising winding of motor 20, so that the latter will be at rest.

Similarly, the lower output section 30 includes a flip-flop circuit consisting of normally off NPN transistor T12, a normally on NPN transistor T13 and a normally off polarity inverting PNP transistor T14. The gate of a silicon control rectifier SCR6 is connected to the collector of T14 through a resistor R36 and its anode and cathode are in circuit between the output terminals 102 and 103 of the full wave rectifier 104 so that when T14 is off, an open circuit will exist between terminals 102 and 103. As a result, the primary winding P6 of transformer E6, which is connected to the input terminals 105 and 106 of rectifier 104, will be open circuited so that secondary winding S6, which is in the energizing circuit 99 and 108 of the lowering winding of motor 20, will have substantially high impedance. As a result, when transistors T10 and T14 are off, the motor 20 will be at rest.

In a similar manner too, when there is insufficient negative charge on capacitor C2, transistor T13 of lower output circuit 30 will be held in the saturation region by a resistor R30 which connects its emitter to the ground bus G, a resistor R29 which connects its collector to the positive supply bus 114 and the resistor string consisting of resistors R31, R32, R33, and R34 connected between ground bus G and positive bus 114. Transistor T12 is reverse biased, on the other hand, with its emitter held at a negative potential by the drop across R30 while its base is held at emitter potential by resistor R35. Polarity reversing transistor T14 is also biased "off" with its emitter connected to positive bus 114, its base connected to junction point 115 between resistors R33 and R34 and its collector connected to the gate electrode of SCR6 through resistor R36. A resistor R37 is, in turn, disposed between the gate and cathode of SCR6. While some current does flow through R34 so that the base potential of transistor T14 is less than its emitter potential, this difference is not sufficient to turn T14 on when transistor T12 is non-conductive.

The operation of the control circuit will now be discussed. With reference again to FIG. 1, the resistors R1, R2, R3 and R4 and diode D1 are chosen so that when the voltage in the load line 15 is within the desired range or band, the potential at junction point 35 will be less negative than the potential at junction point 36 and more negative than the potential at junction point 37. Under this condition of operation, the base potential of T1 will exceed its emitter potential so that it will be nonconductive. Similarly, the base potential of T2 will exceed its emitter potential so that this transistor will also be nonconductive. Because neither of the transistors T1 or T2 are conductive each of the silicon controlled rectifiers SCR1 and SCR2 will also be nonconductive so that the output terminals 44 and 45 of full wave rectifier 40 and the output terminals 46 and 47 of the full wave rectifier 43 will each be open circuited. As a result, the windings S of transformer E1 and P2 of transformer E2 are also open circuited. Thus, no current will flow in secondary winding S2 of transformer E2 whenever the voltage generating circuit 50 delivers a positive voltage pulse to terminal 62. Therefore, no current will flow to the gate electrode of SCR3, so that no current can flow between its anode and cathode which are in circuit between positive square wave input terminal 62 and positive voltage drive circuit 52. Similarly, the windings S3 of transformer E3 and P4 of transformer E4 are also open circuited so that no current flows through the gate electrode of SCR4. In this manner, the positive voltage drive circuit 52 and the negative voltage drive circuit 54 are isolated from the pulse generating circuit 50 and are thereby off, so that no charging current flows to the capacitor C2. With capacitor C2 thus de-energized, transistor T10 of raised output circuit 28 and transistor T12 of lower output portion 30 will each be nonconductive so that no current will flow to the gate electrodes of SCR5 or SCR6. This will open circuit windings P5 and P6 of transformers E5 and E6 so that their secondary windings S5 and S6 will present relatively large impedances to the raise and lowering windings of motor 20 which will be at rest.

If the voltage in load line 15 rises, capacitor C1 will begin charging until the voltage at the capacitor terminals 33 and 34 equals an integral proportional to the new value of the voltage in load line 15. The potential at junction point 35 will become more negative by an equal number of volts. When the load voltage exceeds the band limits, the resulting potential at junction point 35 will be sufficiently more negative than the potential at junction point 36, to cause transistor T1 to become conductive. As a result, trigger current will flow to the gate of SCR1 which will then short circuit the output terminals 44 and 45 of the full wave rectifier 40.

The short circuiting of the terminals 44 and 45 of rectifier 40 constitutes a "lower" signal from the voltage sensing circuit 24.

When a short circuit appears across terminals 44 and 45 of full wave rectifier 40, current flowing from terminal 62 through winding P1 to ground will induce a current in winding S1 which also flows through P2. This induces a current in the secondary winding S2 of transformer E2 so that gate current flows to SCR3.

Terminal 62 of the pulse generator 50 is thereby connected to the positive voltage drive circuit 52 so that as previously described, charging of $+2i$ begins flowing from the collector of T8 to capacitor C2. Negative return circuit 58, however, which is directly connected to negative square wave terminal 65 will also draw a current of $-i$ from terminal 66 of capacitor C2 so that capacitor C2 will begin charging at a net positive rate of $+i$. Although negative return circuit 56 which similarly is directly connected to positive square wave output terminal 62 will conduct a current of $+i$ through conductor 74, this current will be conducted to the ground bus G because diode D13 is forward biased when terminal 66 of capacitor C2 has a net positive charge. However, when terminal 66 has a net positive charge, diode D15 will not be forward biased so that the current of $-i$ can be drawn from terminal 66 through diode D14.

Should the overvoltage in load line 15 be of a transient or non-permanent nature so that the load voltage returns to within its band before the desired time delay of the device, transistors T1 and SCR1 will become nonconductive to open circuit bridge 40 and thereby interrupt the flow of current in winding P2 of transformer E2 and cut off the flow of base current to SCR3 which, in turn, de-energizes the positive drive circuit 52. The current $+2i$ from the positive drive circuit will cease flowing to terminal 66 of capacitor C2 so that it will no longer be receiving a net positive charge. However, positive return circuit 58 will continue drawing current $-i$ from terminal 66 through diode D14 as long as said terminal has a net positive charge so that capacitor C2 will begin discharging at the same rate that it had been charging. This will continue until the potential at terminal 66 becomes zero whereupon diode D15 becomes forward biased and the current flow $-i$ from positive return circuit 58 begins flowing from the ground bus G.

However, should the overvoltage in load line 15 be of a permanent nature, the capacitor C2 will continue charging at a constant rate until the potential at terminal 66 becomes sufficiently high to forward bias D16 between selector switch 90 and the base of T12 so that base current will flow to T12 and the latter will become conductive. As a result, T12 collector current will begin flowing through resistors R33 and R34 which will lower the potential at junction point 115 sufficiently to turn transistor T14 on so that T14 collector current will flow to the gate electrode of SCR6. This causes SCR6 to become conductive thereby short circuiting the bridge 104 and the primary winding P6 of transformer E6 to sharply reduce the impedance offered by secondary winding S6 to energizing current flowing to the lowering winding of motor 20 which begins operating in the direction that will cause the tap changer 18 to operate in a voltage lowering direction.

As tap changes continue, voltage in load line 15 will begin lowering until potential difference between junctions 35 and 36 of the voltage sensing circuit 24 will be insufficient to maintain transistor T1 in a conductive state. As a result, SCR1 and SCR3 will become nonconductive so that the positive drive circuit 52 will cease conducting current to the capacitor C2. Capacitor C2 will begin discharging at a constant rate as the positive return circuit 58 draws a current of $-i$ through conductor 72. In this manner, diode 14 will again become reverse biased so that transistors T12 and T14 turn off and transistor T13 turns on. Upon this event, SCR6 will become nonconductive and winding S6 will again present a high impedance to the lowering winding of motor 20 so that the motor will come to rest.

In the event that the voltage within the load line 15 returns to within its band limits during a tap changing operation, normally open contacts 120 and resistor R38 are provided between the gate electrode of SCR6 and terminal 102 of bridge 104 so that SCR6 will remain fired until the tap changing operation is completed. In a similar manner, normally open contacts 122 coupled to the tap changer 18 will be closed during a tap change so that SCR5 will remain fired during a tap change. Normally closed limit switches 124 and 125 are disposed in conductors 100 and 108 respectively and are mechanically coupled to the tap changer so that the motor 20 may be de-energized if the movement of the tap changer to its limit in one direction or the other is insufficient to bring the voltage within the desired band limits.

Should the voltage in load line 15 fall below the preselected band limits, the potential at junction point 35 will become less negative than the potential at junction point 37, so that the transistor T2 emitter potential will exceed its base potential and it will begin conducting collector current to the gate electrode of SCR2. As a result, SCR2 will begin conducting thereby short circuiting the output terminals 46 and 47 of full wave rectifier 43.

When a short circuit appears across terminals 46 and 47 of rectifier 43, indicating a voltage "raise" signal from the voltage sensing circuit 24, current flowing from terminal 65 to ground through winding P3 will induce a secondary current in winding 53 which also flows through P4 to induce a current in S4. This provides a gate current to SCR4, which then becomes conductive, to connect the negative voltage drive circuit 54 to the negative square wave pulse terminal 65. Thus, each time a negative voltage pulse appears at terminal 65, negative drive circuit 54 will deliver a current pulse, having an integrated value of $-2i$, to terminal 66 of integrating capacitor C2.

If there is a net positive charge in capacitor C2 and the negative drive circuit became conductive then capacitor C2 will be discharged at a rate equal to $3i$ which consists of the current of $-i$ drawn by the positive return circuit 58 whenever there is a net positive charge on terminal 66 and the current $-2i$ drawn by the negative drive circuit 54. This will continue until terminal 66 is at a zero potential whereupon diode D15 will become forward biased so that the positive return circuit 58 will begin drawing current from the ground bus G through diode D15. The negative return circuit 56, however, which had formerly been passing a current of $+i$ to the ground bus G through diode D13 will now begin passing current through diode D12 to terminal 66 so that capacitor C2 begins charging in a negative direction at a constant rate by a net current of $-i$.

Should the voltage in load line 15 remain below the band for the desired time delay, the charge on capacitor C2 will become sufficient to forward bias diode D17 so that base current will begin flowing to transistor T10. This base current in T10, flowing through resistors R26 and R27 will cause a reduction in the current flowing through R25 so that the potential on junction 112 will begin raising relative to the emitter of T11 so that T11 turns off. In addition, the collector current from T10 flowing to the gate electrode of SCR5 causes the latter to begin conducting and thereby short circuiting the bridge 94. This short circuits the primary winding P5 of transformer E5 which, in turn, substantially lowers the impedance that secondary winding S5 presents to the energizing circuit of the voltage raising winding of motor 20. As a result, motor 20 begins driving the tap changer 18 in a direction which will raise the voltage in load line 15.

If it is desired to manually raise the voltage in load line 15, selector switch 90 may be moved to the contact 92 which connects diode D17 to the negative bus 110 through resistor R40 so that a negative voltage signal will be presented to the voltage raising output section 28 sufficient to turn transistor T10 on and thereby initiate tap changing operations. Similarly, movement of the selector switch 90 to the lower contact 93 will connect the voltage lowering output section 30 to the positive bus 114 to the resistor R41 whereby transistor T12 will become conductive to initiate a tap change in the manner described herein above.

I claim:

1. A device for maintaining the voltage in a system within predetermined limits, including reversible electroresponsive means coupled to said system and operable to change the voltage therein, voltage sensing circuit means coupled to said system and operable to produce a first electrical signal when said system voltage rises above said limits and a second electrical signal when said system voltage falls below said limits, integrating circuit means connected to said voltage sensing circuit means for receiving said signals and including a capacitance and circuit means coupled to said capacitance and operable to charge said capacitance at a substantially constant rate in a first sense upon the occurrence of said first electrical signal and to charge said capacitance at said substantially constant rate in an opposite sense upon the occurrence of said second signal, said integrating circuit means also including circuit means coupled to said capacitance for discharging said capacitance at a substantially constant rate upon the cessation of said signals, and output means coupled to said capacitance and to said electroresponsive means and operable to initiate the operation of said electroresponsive means in a voltage lowering direction when the charge in said capacitance reaches a predetermined value in said first sense and to initiate the operation of said electroresponsive means in a voltage raising direction when the charge on said capacitance reaches a predetermined value in said opposite sense.

2. A device for maintaining the voltage in a load circuit within predetermined limits, including electroresponsive means coupled to said load circuit and operable to change said load voltage, voltage sensing circuit means coupled to said load circuit and operable to produce a first electrical signal when said load voltage rises above said limits and a second electrical signal when said load voltage falls below said limits, integrating circuit means connected to said voltage sensing circuit means for receiving said signals and including energy storage means and means coupled to said energy storage means and operable to charge said energy storage means at a constant rate in a first sense upon the occurrence of said first electrical signal and to charge said energy storage means at said constant rate in an opposite sense upon the occurrence of said second signal, said integrating circuit means also including means coupled to said energy storage means for discharging said energy storage means at a constant rate upon the cessation of said signals, and output means coupled to said energy storage means and to said electroresponsive means and operable to initiate the operation of said electroresponsive means in a voltage lowering direction when the charge in said energy storage means reaches a predetermined value in said first sense and to initiate the operation of said electroresponsive means in a voltage raising direction when the charge on said energy storage means reaches a predetermined value in said opposite sense.

3. A device for maintaining the voltage in a system within predetermined limits, reversible electroresponsive means coupled to said system and operable to change the voltage therein, voltage sensing circuit means coupled to said system and operable to produce a first electrical signal when said system voltage falls below said limits and a second electrical signal when said system voltage rises above said limits, an integrating capacitor, charging circuit means coupled to said capacitor and to said voltage sensing circuit means and operable upon the occurrence of said first electrical signal to provide a uniform charging current to said capacitor to charge the same at a constant rate in a first sense and operable upon the occurrence of said second signal to provide a uniform charging current to said capacitor to change the same at said constant rate in an opposite sense, said charging circuit means also including means coupled to said capacitor for discharging said capacitor at a constant rate in either sense upon the cessation of said signals, and output means coupled to said capacitor and to said electroresponsive means and operable to initiate the operation of said electroresponsive means in a voltage raising direction when the charge in said capacitor reaches a predetermined value in said first sense and in a voltage lowering direction when the charge on said capacitor reaches a predetermined value in said opposite sense.

4. A device for maintaining the voltage in a system within predetermined limits, reversible electroresponsive means coupled to said system and operable to change the voltage therein, voltage sensitive circuit means coupled to said system for producing voltage signals which vary in accordance with variations in the magnitude of said system voltage, reference voltage signal means, voltage signal comparison means coupled to said voltage sensitive circuit means and said reference voltage circuit means and operable to produce a first electrical signal when said voltage signals have a first predetermined relation and a second electrical signal when said voltage signals have a second predetermined relation, an integrating capacitor, circuit means coupled to said capacitor and to said voltage signal comparison means and operable upon the occurrence of said first electrical signal to provide a uniform charging current to said capacitor to charge the same at a constant rate in a first sense and operable upon the occurrence of said second signal to provide a uniform charging current to said capacitor to change the same at said constant rate in an opposite sense, means in circuit with said capacitor for discharging the same at a constant rate in either sense upon the cessation of said signals, and output means coupled to said capacitor and to said electroresponsive means and including a first electronic means operable to initiate the operation of said electroresponsive means in a voltage raising direction when the charge in said capacitor reaches a predetermined value in said first sense and second electronic means operable to initiate the operation of said electroresponsive means in voltage lowering direction when the charge on said capacitor reaches a predetermined value in said opposite sense.

5. A device for maintaining the voltage in a system within predetermined limits, reversible electroresponsive means coupled to said system and operable to change the voltage therein, voltage sensing circuit means coupled to said system and operable to produce a first electrical signal when said system voltage falls below said limits and a second electrical signal when said system voltage rises above said limits, an integrating capacitor, constant current circuit means coupled to said capacitor, switching circuit means coupled to said voltage sensing circuit means and to said constant current circuit means and operable upon the occurrence of said first electrical signal to initiate the flow of a uniform charging current to said capacitor to charge the same at a constant rate in a first sense and operable upon the occurrence of said second electrical signal to initiate the flow of a uniform charging current to said capacitor to charge the same at a constant rate in an opposite sense, said integrating circuit means also including means coupled to said capacitor for discharging said capacitor at a constant rate in either sense upon the cessation of said signals, and output means coupled to said integrating capacitor and to said electroresponsive means and operable to initiate the operation of said electroresponsive means in a voltage raising direction when the charge in said capacitor reaches a predetermined value in said first sense and to initiate the operation of said electroresponsive means in a voltage lowering direction when the charge on said integrating capacitor reaches a predetermined value in said opposite sense.

6. A voltage regulating device for maintaing the voltage in a system within predetermined limits, electroresponsive means connected to said system for changing the voltage in said system, voltage sensing means coupled to said system for producing a first electrical signal when said system voltage falls below said limits and a second electrical signal when said system voltage rises above said limits, current integrating means, constant current circuit means coupled to said current integrating means, switching circuit means connected to said voltage sensing circuit means and to said constant current circuit means and operable upon the occurrence of said first electrical signal to initiate the flow of uniform charging current to said current integrating means to charge the same at a constant rate in a first sense and operable upon the occurrence of said second signal to initiate the flow of a uniform charging current to said current integrating means to change the same at said constant rate in an opposite sense, means coupled to said current integrating means for discharging said current integrating means at a constant rate in either sense upon the cessation of said electrical signals, and output means coupled to said current integrating means and to said electroresponsive means and operable to initiate the operation of said electroresponsive means in a voltage raising direction when the charge in said current integrating means reaches a predetermined value in said first sense and to initiate the operation of said electroresponsive means in a voltage lowering direction when the charge on said current integrating means reaches a predetermined value in said opposite sense.

7. A voltage regulating device for maintaing the voltage in a system within predetermined limits, a voltage transformer having output terminals connected to said system and tap changing means for changing the voltage at said output terminals, voltage sensitive circuit means coupled to said system for producing voltage signals which vary in accordance with variations in the magnitude of said system voltage, reference voltage signal means, voltage signal comparison means in circuit with said voltage sensitive circuit means and said reference voltage circuit means and operable to produce a first electrical signal when said voltage signals have a first predetermined relation and a second electrical signal when said voltage signals have a second predetermined relation, an integrating capacitor, constant current circuit means coupled to said capacitor, switching circuit means connected to said voltage sensing circuit means and to said constant current circuit means and operable upon the occurrence of said first electrical signal to initiate the flow of uniform charging current to said capacitor to charge the same at a constant rate in a first sense and operable upon the occurrence of said second signal to initiate the flow of a uniform charging current to said capacitor to charge the same at said constant rate in an opposite sense, means coupled to said integrating capacitor for discharging said integrating capacitor at a constant rate in either sense upon the cessation of said electrical signals, and output means including a first and second electronic circuit means each having a control element coupled to said integrating capacitor and a pair of output elements coupled to said tap changing means, said first electronic circuit means being operable to initiate the operation of said tap changer in a voltage raising direction when the charge in said capacitor reaches a predetermined value in said first sense and said second electronic means being operable to initiate the operation of said tap changing means in a voltage lowering direction when the charge on said integrating capacitor reaches a predetermined value in said opposite sense.

8. A voltage regulating device for maintaining the voltage in a system within predetermined limits, reversible electroresponsive means coupled to said system for changing the voltage therein, an integrating capacitor, constant current circuit means coupled to said capacitor and operable to produce periodically recurring current pulses, voltage sensing circuit means coupled to said system and to said constant current circuit means and operable when said system voltage falls below said limits to initiate the flow of certain of said current pulses to said capacitor to charge the same at a constant rate in a first sense and operable when said system voltage rises above said limits to initiate the flow of other of said current pulses to said capacitor to change the same at said constant rate in an opposite sense, means coupled to said integrating capacitor for discharging said integrating capacitor at a constant rate in either sense when said system voltage returns to said limits, and output means coupled to said integrating capacitor and to said electroresponsive means and operable to initiate the operation of said electroresponsive means in a voltage raising direction when the charge in said capacitor reaches a predetermined value in said first sense and to initiate the operation of said electroresponsive means in a voltage lowering direction when the charge on said integrating capacitor reaches a predetermined value in said opposite sense.

9. A voltage regulating device for maintaining the voltage in a system within predetermined limits, reversible electroresponsive means coupled to said system for changing the voltage therein, an integrating capacitor, first and second constant current circuit means coupled to said capacitor and operable to produce first and second periodically recurring current pulses, voltage sensing circuit means coupled to said system and to said constant current circuit means and operable when said system voltage falls below said limits to initiate the flow of said first current pulses to said capacitor to charge the same at a constant rate in a first sense and operable when said system voltage rises above said limits to initiate the flow of said second current pulses to said capacitor to change the same at said constant rate in an opposite sense each of said first and second constant current circuit means including, means for adjusting the time-energy integral of said pulses so that the charging rate of said capacitor may be adjusted, means coupled to said integrating capacitor for discharging said integrating capacitor at a constant rate in either sense when said system voltage returns to said limits, and output means coupled to said integrating capacitor and to said electroresponsive means and operable to initiate the operation of said electroresponsive means in a voltage raising direction when the charge in said capacitor reaches a predetermined value in said first sense and to initiate the operation of said electroresponsive means in a voltage lowering direction when the charge on said integrating capacitor reaches a predetermined value in said opposite sense.

10. A voltage regulating device for maintaining the voltage in a system within predetermined limits, reversible electroresponsive means coupled to said system for changing the voltage therein, voltage sensing circuit means coupled to said system and operable to produce a first electrical signal when said system voltage falls below said limits and a second electrical signal when said system voltage rises above said limits, an integrating capacitor, constant current circuit means coupled to said capacitor and operable to produce periodically recurring current pulses, switching circuit means connected to said voltage sensing circuit means and to said constant current circuit means and operable upon the occurrence of said first electrical signal to initiate the flow of certain of said current pulses to said capacitor to charge the same at a constant rate in a first sense and operable upon the occurrence of said second signal to initiate the flow of other of said current pulses to said capacitor to charge the same at said constant rate in an opposite sense, said constant current circuit means including means for adjusting the time-energy integral of said pulses so that the charging rate of said capacitor may be adjusted, means coupled to said integrating capacitor for discharging said integrating capacitor at a constant rate in either sense upon the cessation of said electrical signals, and output means coupled to said integrating capacitor and to said electroresponsive means and operable to initiate the operation of said electroresponsive means in a voltage raising direction when the charge in said capacitor reaches a predetermined value in said first sense and to initiate the operation of said electroresponsive means in a voltage lowering direction when the charge on said integrating capacitor reaches a predetermined value in said opposite sense.

11. A voltage regulating device for maintaining the voltage in a system within predetermined limits, electroresponsive means connected to said system for changing the voltage in said system, voltage responsive circuit means coupled to said system and operable to produce a first electrical signal when said system voltage falls below said limits and a second electrical signal when said system voltage rises above said limits, current integrating means, constant current circuit means coupled to said current integrating means and operable to produce periodically recurring current pulses, switching circuit means connected to said voltage responsive circuit means and to said constant current circuit means and operable upon the occurrence of said first electrical signal to initiate the flow of certain of said current pulses to said current integrating means to charge the same at a constant rate in a first sense and operable upon the occurrence of said second signal to initiate the flow of other of said current pulses to said current integrating means to charge the same at said constant rate in an opposite sense, said constant current circuit means including means for adjusting the time-energy integral of said pulses so that the charging rate of said current integrating means may be adjusted, means coupled to said current integrating means for discharging said current integrating means at a constant rate in either sense upon the cessation of said electrical signals, and output means including a first and second electronic circuit means each having a control element coupled to said current integrating means and a pair of output elements coupled to said electroresponsive means, said first electronic circuit means being operable to initiate the operation of said electroresponsive means in a voltage raising direction when the charge in said current integrating means reaches a predetermined value in said first sense and said second electronic circuit means being operable to initiate the operation of said electroresponsive means in a voltage lowering direction when the charge on said current integrating means reaches a predetermined value in said opposite sense.

12. A voltage regulating device for maintaining the voltage in a system within predetermined limits, reversible electroresponsive means coupled to said system for changing the voltage therein, voltage responsive circuit means coupled to said system and operable to produce a first electrical signal when said system voltage falls below said limits and a second electrical signal when said system voltage rises above said limits, current integrating means, constant current circuit means coupled to said current integrating means and operable to produce periodically recurring current pulses, switching circuit means connected to said voltage sensing circuit means and to said constant current circuit means and operable upon the occurrence of said first electrical signal to initiate the flow of certain of said current pulses to said current integrating means to charge the same at a constant rate in a first sense and operable upon the occurrence of said second signal to initiate the flow of other of said current pulses to said current integrating means to charge the same at said constant rate in an opposite sense, said constant current circuit means including means for adjusting the time-energy integral of said pulses so that the charging rate of said current integrating means may be adjusted, means coupled to said current integrating means for discharging said current integrating means at a constant rate in either sense upon the cessation of said electrical signals, and output means coupled to said current integrating means and to said electroresponsive means and operable to initiate the operation of said electroresponsive means in a voltage raising direction when the charge in said current integrating means reaches a predetermined value in said first sense and to initiate the operation of said electroresponsive means in a voltage lowering direction when the charge on said current integrating means reaches a predetermined value in said opposite sense.

13. A device for maintaining the voltage in a system within predetermined limits, including reversible voltage modifying means coupled to said system, energy storage means, substantially constant charging circuit means coupled to said energy storage means and operable to selectively charge and discharge said energy storage means at a substantially constant rate in either a first sense or in an opposite sense, voltage sensing circuit means coupled to said system and to said charging circuit means and operative to initiate the charging of said energy storage means at said substantially constant rate in said first sense when said system voltage rises above said limits and to initiate the charging of said energy storage means at said substantially constant rate in said opposite sense when said system voltage falls below said limits, said voltage sensing circuit means also being operative to initiate the discharge of said energy storage means at said substantially constant rate when said voltage returns to within said limits, and output means coupled to said energy storage means and to said voltage modifying means and operable to initiate the operation of said voltage modifying means in a voltage lowering direction when the charge on said energy storage means reaches a predetermined value in said first sense and to initiate the operation of said voltage modifying means in a voltage raising direction when the charge on said energy storage means reaches a predetermined value in said opposite sense.

14. A device for maintaining the voltage in a system within predetermined limits, including reversible voltage modifying means coupled to said system, an integrating capacitance, substantially constant charging circuit means coupled to said integrating capacitance and operable to selectively charge and discharge said integrating capacitance at a substantially constant rate in either a first sense or in an opposite sense, voltage sensing circuit means coupled to said system and to said charging circuit means and operative to initiate the charging of said capacitance at said substantially constant rate in said first sense when said system voltage rises above said limits and to initiate the charging of said capacitance at said substantially constant rate in said opposite sense when said load voltage falls below said limits, said voltage sensing circuit means also being operative to initiate the discharge of said capacitance at said substantially constant rate when said voltage returns to within said limits, and output means coupled to said capacitance and to said voltage modifying means and operable to initiate the operation of said voltage modifying means in a voltage lowering direction when the charge on said capacitance means reaches a predetermined value in said first sense and to initiate the operation of said voltage modifying means in a voltage raising direction when the charge on said capacitance reaches a predetermined value in said opposite sense.

15. A device for maintaining the voltage in a system within predetermined limits, reversible electroresponsive means coupled to said system and operable to change the voltage therein, voltage sensing circuit means coupled to said system and operable to produce a first electrical signal when the system voltage falls below said limits and a second electrical signal when said system voltage rises above said limits, integrating capacitor means, constant charging current circuit means coupled to said capacitor means and to said voltage sensing circuit means and operable upon the occurrence of said first electrical signal to produce a uniform charging current having a first polarity to said capacitor means to charge the same at a constant rate in a first sense and operable upon the occurrence of said second electrical signal to provide uniform charging current to said capacitor means having an opposite polarity to charge the same at a constant rate in an opposite sense, said charging current circuit means also being operable to provide uniform current of said opposite polarity upon the cessation of said first electrical signal and to provide uniform current of said first polarity upon the cessation of said second electrical signal to discharge said capacitor means at said constant rate when said voltage returns to within said limits, and output means coupled to said capacitor means and to said electroresponsive means and operable to initiate the operation of said electroresponsive means in a voltage raising direction when the charge on said capacitor means reaches a predetermined value in said first sense and in a voltage lowering direction when the charge on said capacitor means reaches a predetermined value in said opposite sense.

16. The device set forth in claim 15 wherein the charging circuit means includes means for adjusting the time-energy integral of said uniform charging and discharging currents.

17. A device for maintaining the voltage in a system within predetermined limits, reversible electroresponsive means coupled to said system and operable to change the voltage therein, voltage sensing circuit means coupled to said system and operable to produce a first electrical signal when said system voltage falls below said limits and a second electrical signal when said system voltage rises above said limits, current integrating means, charging circuit means coupled to said current integrating means and to said voltage sensing circuit means and operable upon the occurrence of said first electrical signal to provide a uniform charging current to said current integrating means to charge the same at a constant rate in a first sense and operable upon the occurrence of said second signal to provide uniform charging current to said current integrating means to charge the same at said constant rate in an opposite sense, said charging circuit means also including means coupled to said current integrating means for discharging said current integrating means at a constant rate in either sense upon the cessation of said signals, and output means coupled to said current integrating means and to said electroresponsive means and operable to initiate the operation of said electroresponsive means in a voltage raising direction when the charge on said current integrating means reaches a predetermined value in said first sense and a voltage lowering direction when the charge on said current integrating means reaches a predetermined value in said opposite sense.

18. A device for maintaining the voltage in a system within predetermined limits, reversible electroresponsive means coupled to said system and operable to change the voltage therein, voltage sensing circuit means coupled to said system and operable to produce a first electrical signal when the system voltage falls below said limits and a second electrical signal when said system voltage rises above said limits, integrating capacitor means, constant current means coupled to said capacitor means, switching circuit means connected to said voltage sensing circuit means and to said constant current circuit means and operable upon the occurrence of said first electrical signal to initiate the flow of charging current to said capacitor means to charge the same at a constant rate in said first sense and operable upon the occurrence of said second electrical signal to initiate the flow of charging current to said capacitor means to charge the same at said constant rate in an opposite sense, said switching circuit means also being operable to initiate the flow of uniform current having said opposite polarity upon the cessation of said first electrical signal and uniform current having said first polarity upon the cessation of said second electrical signal, and output means coupled to said capacitor means and to said electroresponsive means and operable to initiate the operation of said electroresponsive means in a voltage raising direction when the charge on said capacitor means reaches a predetermined value in said first sense and in a voltage lowering direction when the charge in said capacitor means reaches a predetermined value in said opposite sense.

19. A device for maintaining the voltage in a system within predetermined limits, reversible electroresponsive means coupled to said system and operable to change the voltage therein, voltage sensing circuit means coupled to said system and operable to produce a first electrical signal when the system voltage falls below said limits and a second electrical signal when said system voltage rises above said limits, integrating capacitor means, charging circuit means including constant current circuit means operable to produce periodically recurring current pulses, said charging circuit means being coupled to said voltage sensing circuit means for receiving said electrical signals, said charging circuit means being operable upon the occurrence of said first electrical signal to initiate the flow of uniform current pulses having a first polarity to said capacitor means to charge the same at a constant rate in a first sense, said charging circuit means also being operable upon the occurrence of said second electrical signal to initiate the flow of said uniform current pulses having a second polarity to said capacitor means to charge the same at a constant rate in an opposite sense, said charging circuit means also being operable upon the cessation of said signals to initiate the flow of said current pulses of an opposite polarity to that of the charge on said capacitor means so that said capacitor means will discharge at a constant rate in either sense when the voltage returns to said limits, and output means coupled to said capacitor means and to said electroresponsive means and operable to initiate the operation of said electroresponsive means in a voltage raising direction when the charge in said capacitor means reaches a predetermined value in said first sense and in a voltage lowering direction when the charge on said capacitor means reaches a predetermined value in said opposite sense.

20. A device for maintaining the voltage in a system within predetermined limits, reversible electroresponsive means coupled to said system and operable to change the voltage therein, voltage sensing circuit means coupled to said system and operable to produce a first electrical signal when the system voltage falls below said limits and a second electrical signal when said system voltage rises above said limits, integrating capacitor means, charging circuit means coupled to said capacitor means and to said voltage sensing circuit means and including at least one constant current source constructed and arranged to produce a constant current having a first polarity relative to said capacitor means upon the occurrence of said first electrical signal to charge said capacitor means at a constant rate in a first sense, said constant current source also being constructed and arranged to produce a constant current having an opposite polarity upon the occurrence of said second electrical signal to charge said capacitor means at a constant rate in an opposite sense, said charging circuit means also being operable to provide uniform current of said opposite polarity upon the cessation of said first electrical signal and to provide uniform current of said first polarity upon the cessation of said second electrical signal to discharge said capacitor means at said constant rate when said voltage returns within said limits, and output means coupled to said capacitor means and to said electroresponsive means and operable to initiate the operation of said electroresponsive means in a voltage raising direction when the charge in said capacitor means reaches a predetermined value of said first polarity an in the voltage lowering direction when the charge of said capacitor means reaches a predetermined value of said opposite polarity.

References Cited by the Examiner

UNITED STATES PATENTS

| | | | |
|---|---|---|---|
| 2,619,630 | 11/1952 | Stone | 323—43.5 X |
| 2,619,631 | 11/1952 | Hamilton et al. | 323—47 |
| 2,752,556 | 6/1956 | Webb et al. | 323—43.5 |
| 2,913,657 | 11/1959 | Erickson | 323—43.5 |
| 3,026,470 | 3/1962 | Webb | 323—43.5 |
| 3,123,762 | 3/1964 | Throop | 323—22 |

LLOYD McCOLLUM, *Primary Examiner.*